> United States Patent Office 3,631,040
Patented Dec. 28, 1971

3,631,040
IMIDAZO[1,2-b]-AS-TRIAZINES
Bernard Loev, Broomall, Pa., assignor to Smith Kline
& French Laboratories, Philadelphia, Pa.
No Drawing. Filed Feb. 7, 1969, Ser. No. 797,706
Int. Cl. C07d 57/34
U.S. Cl. 260—249.5         7 Claims

ABSTRACT OF THE DISCLOSURE 1,5-dihydro-2,6-diphenylimidazo[1,2-b] - as - triazines are prepared either by reaction of a phenylglyoxal and aminoguanidine to give an aminophenyltriazine, further reaction with a phenacyl bromide, and reduction with borohydride; or directly by reaction of phenacyl bromide, aminoguanidine, and hydrogen bromide; and subsequent ring-closure in base. The products are antidepressants.

---

This invention relates to heterocyclic compounds, antidepressant compositions containing said compounds, and to methods of using said compounds and compositions. In particular, the invention relates to dihydrodiphenyl-imidazo-[1,2-b]as-triazines.

The subject matter of the invention consists of compounds represented by the following structural formula:

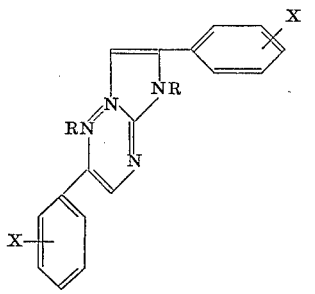

where

X is hydrogen, chloro, bromo, fluoro, trifluoromethyl, lower alkyl of up to 4 carbons, or lower alkoxy of up to 4 carbon atoms, with the proviso that no more than one of the X groups is hydrogen, chloro, or bromo; and R is hydrogen or lower alkyl of up to 4 carbon atoms.

Also part of the subject matter of the invention are the pharmaceutically acceptable acid addition salts of the compounds of Formula I, including the hydrochloride, sulfate, maleate, tartrate and nitrate.

The compounds of Formula I are prepared by either of the two synthetic routes schematically illustrated below.

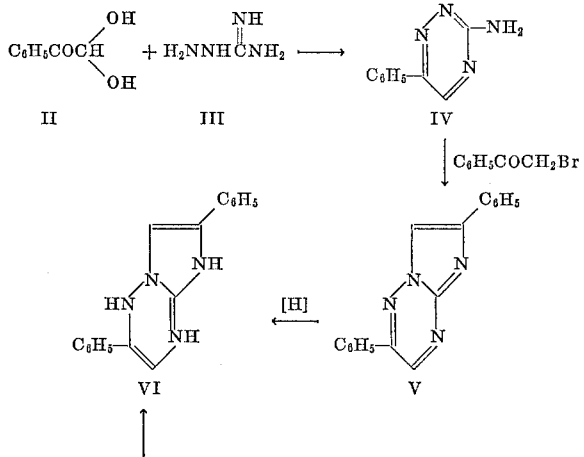

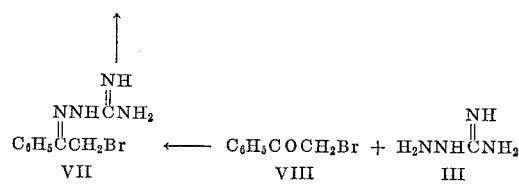

According to one of the methods, phenylglyoxal (II) and aminoguanidine (III) are allowed to react in strongly basic solution to give the aminophenyltriazine IV. This is conveniently accomplished by combining the phenylglyoxal as its hydrate and the aminoguanidine as a salt such as the bicarbonate in acid solution, then making the mixture basic and stirring for a short period of time. Heating the triazine IV with phenacyl bromide gives the 2,6-diphenylimidazotriazine V, which is reduced to the dihydro product VI with a reducing agent such as sodium borohydride.

These compounds are also prepared by the reaction of phenacyl bromide, aminoguanidine, and concentrated hydrogen bromide to give the guanyl hydrazone VII as its hydrobromide salt, and subsequent ring-closure in the presence of a base such as ammonium hydroxide to give the product VI. This latter route is the preferred one when the phenyl groups are unsubstituted or when the substituents thereon are the same.

In order to prepare the substituted phenyl products, one utilizes as a starting material the corresponding substituted phenylglyoxal and/or phenacyl bromide. For example, in employing the first sequence, use of a substituted phenylglyoxal gives a 2-substituted phenyl product and use of a substituted phenacyl bromide gives a 6-substituted phenyl product. Among the substituted phenyl compounds that may therefore be used are p-chlorophenylglyoxal, p-bromophenylglyoxal, m-trifluoromethylphenylglyoxal, o-tolylglyoxal, p-anisylglyoxal, p-chlorophenacyl bromide, p-bromophenacyl bromide, p-methylphenacyl bromide, o-chlorophenacyl bromide, and m-methoxyphenacyl bromide. Use of a substituted phenacyl bromide in the second sequence gives the 2,6-bis(substituted phenyl) product.

Compounds in which R is lower alkyl rather than hydrogen are prepared by treating the corresponding compound in which R is hydrogen with an alkylating agent such as dimethyl sulfate, ethyl iodide, or butyl bromide.

The compounds of Formula I are antidepressants as indicated by standard pharmacological test procedures. The preferred compound, 1,5-dihydro-2,6-diphenylimidazo[1,2-b]-astriazine, has been found to significantly prevent reserpine-induced ptosis in mice in oral doses of 1–50 mg./kg. and in rats in oral doses of 75 mg./kg. In mice the oral ED$_{50}$ at 95% confidence limits is 12.0 mg./kg.

The compounds are formulated for use into tablets, capsules, and injectables according to standard pharmaceutical techniques and then administered to depressed animals in doses of 1–500 mg., depending upon the subject's weight, the degree of effect desired, and other pertinent factors. In a tablet, the active component or salt thereof may be combined with a carrier, including materials such as lactose, sucrose, magnesium stearate, stearic acid, starch, terra alba, talc, calcium phosphate, gelatin, agar, pectin, or acacia. A capsule may be prepared by placing the active component or salt, either alone or incorporated into a solid carrier, in a hard gelatin capsule. An injectable formulation may consist of a solution of the active component or salt in saline solution, purified water, or sugar solution, possibly with preservatives such as parabens added.

The following examples are intended to illustrate the preparation of the compounds and compositions of the invention, but are not to be construed as limiting the scope thereof.

EXAMPLE 1

3-amino-6-phenyl-1,2,4-triazine

To an aqueous suspension of 7.6 g. (0.056 mole) of aminoguanidine bicarbonate which has brought to pH 3–4 by the addition of 18% HCl, is added with stirring an aqueous solution of 8.5 g. (0.056 mole) of phenylglyoxal hydrate. The resulting solution is treated with an excess of 50% KOH until it is strongly basic, stirred for about 45 minutes, and filtered. The solid is twice recrystallized from boiling isopropanol and the hot solution allowed to cool slowly without chilling to give the title compound; M.P. 193–194.5°.

EXAMPLE 2

2,6-diphenylimidazo[1,2-b]as-triazine

A mixture of 1 g. (0.0058 mole) of 3-amino-6-phenyl-1,2,4-triazine and 1.16 g. (0.0058 mole) of phenacyl bromide in ethanol is refluxed with stirring for 2 hours. The mixture is then chilled and the solid product filtered off; M.P. 224–227°.

EXAMPLE 3

1,5-dihydro-2,6-diphenylimidazo[1,2-b]-as-triazine

To a suspension of 2.72 g. (0.01 mole) of 2,6-diphenylimidazo[1,2-b]-as-triazine in 125 ml. of methanol, cooled to 10°, is added portionwise 0.95 g. (0.025 mole) of NaBH$_4$. The reaction is then stirred overnight at room temperature and filtered to give the title product, M.P. 204–208°.

EXAMPLE 4

1,5-dihydro-2,6-diphenylimidazo[1,2-b]-as-triazine

To a stirred suspension of 200 g. (1 equiv.) of phenacyl bromide and 136 g. (1 equiv.) of aminoguanidine bicarbonate in 750 ml. of ethanol is added dropwise, but rapidly, 200 ml. of conc. HBr. The mixture is stirred for 15 minutes after the addition is complete, chilled, and filtered. The solid, phenacyl bromide monoguanyl hydrazone hydrobromide, is washed with isopropyl ether, melts at 196–198°, and may be recrystallized by solution in cold methanol and precipitation with isopropyl ether; M.P. 199–200°.

To a stirred suspension of 336 g. (1 mole) of the above hydrazone hydrobromide in 1500 ml. of methanol is added rapidly, but dropwise, 200 ml. of conc. (.28%) NH$_4$OH (1 mole). Cooling may be necessary. The solution is then stirred for 2 hours and filtered. The recovered solid product is washed with ether and recrystallized by dissolving in boiling dimethylformamide and adding water, or from nitromethane; M.P. 208–210°.

EXAMPLE 5

2,6-diphenylimidazo[1,2-b]as-triazine

To a stirred solution of 30 g. (0.11 mole) of 1,5-dihydro-2,6-diphenylimidazo[1,2-b]-as-triazine in 1500 ml. of 3% KOH in ethanol is added 180 ml. of 30% H$_2$O$_2$. The reaction is stirred without heating until gas is no longer evolved (ca. 1 hour) and then refluxed for ca. one-half hour. The mixture is then chilled and the product filtered off and recrystallized from dioxane; M.P. 225–227° d.

EXAMPLE 6

When the following substituted phenylglyoxal hydrates are each allowed to react with aminoguanidine under basic conditions as described in Example 1, the following listed 6-substituted phenyltriazines are obtained.

| Glyoxal: | Triazine |
|---|---|
| p-Chlorophenylglyoxal | 3-amino-6-p-chlorophenyl,2,4-triazine. |
| p-Bromophenylglyoxal | 3-amino-6-p-bromophenyl-1,2,4-triazine. |
| m-Trifluoromethylphenylglyoxal | 3-amino-6-m-trifluoromethylphenyl-1,2,4-triazine. |
| o-Tolylglyoxal | 3-amino-6-o-tolyl-1,2,4-triazine. |
| p-Anisylglyoxal | 3-amino-6-p-anisyl-1,2,4-triazine. |

EXAMPLE 7

When the triazine intermediates of Example 6 are treated with phenacyl bromide according to the conditions of Example 2, the following 2-substituted phenylimidazo[1,2-b]-astriazines are obtained, respectively.

2-p-chlorophenyl-6-phenylimidazo[1,2-b]-as-triazine
2-p-bromophenyl-6-phenylimidazo[1,2-b]-as-triazine
2-m-trifluoromethylphenyl-6-phenylimidazo[1,2-b]-as-triazine
2-o-tolyl-6-phenylimidazo[1,2-b]-as-triazine
2-p-anisyl-6-phenylimidazo[1,2-b]-as-triazine

EXAMPLE 8

When the imidazo[1,2-b]-as-triazines of Example 7 are reduced with sodium borohydride as described in Example 3, the following dihydroimidazotriazine products are obtained, respectively.

2-p-chlorophenyl-6-phenyl-1,5-dihydroimidazo[1,2-b]-as-triazine
2-p-bromophenyl-6-phenyl-1,5-dihydroimidazo[1,2-b]-as-triazine
2-m-trifluoromethylphenyl-6-phenyl-1,5-dihydroimidazo[1,2-b]-as-triazine
2-o-tolyl-6-phenyl-1,5-dihydroimidazo[1,2-b]-as-triazine
2-p-anisyl-6-phenyl-1,5-dihydroimidazo[1,2-b]-as-triazine

EXAMPLE 9

When 3-amino-6-phenyl-1,2,4-triazine is treated with the following substituted phenacyl bromides according to the procedure of Example 2, the following listed 6-substituted phenylimidazo[1,2-b]-as-triazines are obtained, respectively.

| Phenacyl bromide: | Imidazotriazine |
|---|---|
| p-Chlorophenacyl bromide | 2-phenyl-6-p-chlorophenylimidazo[1,2-b]-as-triazine. |
| p-Bromophenacyl bromide | 2-phenyl-6-p-bromophenylimidazo[1,2-b]-as-triazine. |
| p-Methylphenacyl bromide | 2-phenyl-6-p-tolylimidazo[1,2-b]-as-triazine. |
| o-Chlorophenacyl bromide | 2-phenyl-6-o-chlorophenylimidazo[1,2-b]-as-triazine. |
| m-Methoxyphenacyl bromide | 2-phenyl-6-m-anisylimidazo[1,2-b]-as-triazine. |

EXAMPLE 10

When the imidazo[1,2-b]-as-triazines of Example 9 are reduced with sodium borohydride as described in Example 3, the following dihydroimidazotriazine products are obtained, respectively.

2-phenyl-6-p-chlorophenyl-1,5-dihydroimidazo[1,2-b]-as-triazine
2-phenyl-6-p-bromophenyl-1,5-dihydroimidazo[1,2-b]-as-triazine
2-phenyl-6-p-tolyl-1,5-dihydroimidazo[1,2-b]-as-triazine
2-phenyl-6-o-chlorophenyl-1,5-dihydroimidazo[1,2-b]-as-triazine
2-phenyl-6-m-anisyl-1,5-dihydroimidazo[1,2-b]-as-triazine

EXAMPLE 11

1,5-dimethyl-1,5-dihydro-2,6-diphenylimidazo[1,2-b]-as-triazine

To a solution of 2 g. of 1,5-dihydro-2,6-diphenyl-imidazo[1,2-b]-as-triazine in 50 ml. of acetone is added at least 2 molar equivalents of dimethyl sulfate. The mixture is refluxed for 6 hours, evaporated in vacuo, and poured into water containing at least 2 molar equivalents of KOH. The title product is either filtered off or extracted with ether or chloroform.

Use of diethyl sulfate, propyl iodide, or butyl bromide gives the corresponding diethyl, dipropyl, or dibutyl compounds, respectively.

When 1,5-dihydro - 2,6-diphenylimidazo[1,2-b]-as-triazine is dissolved in acetone, ether, or hot ethanol, and dry hydrogen chloride passed into the solution, the hydrochloride salt is obtained.

Use of sulfuric acid, maleic acid, or other pharmaceutically acceptable acid instead of hydrogen chloride gives the corresponding salt.

EXAMPLE 12

An antidepressant capsule has the following composition:

|  | Mg. |
|---|---|
| 1,5-dihydro-2,6-diphenylimidazo[1,2-b]-as-triazine | 25 |
| Lactose, starch, or terra alba | 25 |

An antidepressant tablet has the following composition:

|  | Mg. |
|---|---|
| 1,5-dihydro-2,6-diphenylimidazo[1,2-b]-as-triazine | 25 |
| Magnesium stearate | 2.5 |
| Starch | 5 |
| Terra alba | 15 |

Granulate with syrup or 5% gelatin solution
Terra alba q.s. ad 50 mg.

An injectable may contain 10 mg. of the above compound as the hydrochloride, 40 mg. of dextrose, 1.5 mg. of methylparaben, and water to make 1 cc.

EXAMPLE 13

When the following phenacyl bromides and aminoguanidine bicarbonate are allowed to react according to the procedure of Example 4, the corresponding products are obtained.

Phenacyl bromide:

p-fluorophenacyl bromide
m-ethoxyphenacyl bromide
o-methylphenacyl bromide

Product:

1,5-dihydro-2,6-bis(p-fluorophenyl)imidazo[1,2-b]-as-triazine
1,5-dihydro-2,6-bis(m-ethoxyphenyl)imidazo[1,2-b]-as-triazine
1,5-dihydro-2,6-bis(o-tolyl)imidazo[1,2-b]-as-triazine

I claim:
1. A compound selected from the group consisting of a compound of the formula

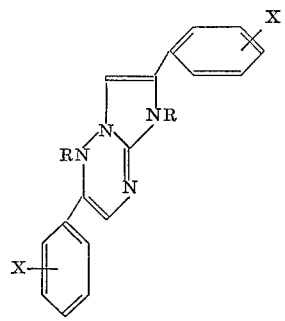

wherein
each X group is hydrogen, chloro, bromo, fluoro, trifluoromethyl, lower alkyl of up to 4 carbon atoms or lower alkoxy of up to 4 carbon atoms, with the proviso that no more than one of the X groups is hydrogen, chloro, or bromo; and R is hydrogen or lower alkyl of up to 4 carbon atoms,
and a pharmaceutically acceptable acid addition salt thereof.

2. A compound according to claim 1 where R is hydrogen.

3. A compound according to claim 2, being the compound 2-m - trifluoromethylphenyl-6-phenyl-1,5-dihydroimidazo[1,2-b]-as-triazine.

4. A compound according to claim 2, being the compound 2 - p - chlorophenyl-6-phenyl-1,5-dihydroimidazo[1,2-b]-as-triazine.

5. A compound according to claim 2, being the compound 2 - p - anisyl-6-phenyl-1,5-dihydroimidazo[1,2-b]-as-triazine.

6. A compound according to claim 2, being the compound 1,5-dihydro - 2,6 - bis(p-fluorophenyl)imidazo[1,2-b]-as-triazine.

7. A compound according to claim 2, being the compound 2-phenyl - 6 - o - chlorophenyl-1,5-dihydroimidazo[1,2-b]-as-triazine.

References Cited

UNITED STATES PATENTS

| 3,422,194 | 1/1969 | Loev | 260—249.5 X |
| 3,496,175 | 2/1970 | Eberle | 260—249.5 |

OTHER REFERENCES

Beyer et al.: Ann., vol. 605, pp. 50–8 (1957).
Loev et al.: Tetrahedron Letters, pp. 789–94 (1968).

JOHN M. FORD, Primary Examiner

U.S. Cl. X.R.

260—564 F; 424—249